United States Patent
Chang et al.

(10) Patent No.: US 10,355,802 B2
(45) Date of Patent: Jul. 16, 2019

(54) METHOD OF CELL SEARCH

(71) Applicant: Realtek Semiconductor Corp., HsinChu (TW)

(72) Inventors: Chung-Yao Chang, Hsinchu County (TW); Chuan-Hu Lin, Changhua County (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 15/268,638

(22) Filed: Sep. 19, 2016

(65) Prior Publication Data
US 2017/0223668 A1    Aug. 3, 2017

(30) Foreign Application Priority Data
Feb. 3, 2016    (TW) .............................. 105103403 A (51) Int. Cl.
*H04J 11/00*    (2006.01)
*H04W 88/02*    (2009.01)

(52) U.S. Cl.
CPC ............. *H04J 11/00* (2013.01); *H04W 88/02* (2013.01)

(58) Field of Classification Search
CPC .... H04J 11/00; H04J 11/0073; H04J 11/0076; H04W 88/02; H04W 56/001; H04W 72/04; H04W 72/042; H04W 24/08; H04W 48/16; H04W 48/12; H04L 27/26
See application file for complete search history.

(56) References Cited

U.S. PATENT DOCUMENTS

| | | | | |
|---|---|---|---|---|
| 2013/0122822 | A1* | 5/2013 | Srinivasan | H04J 11/0073 455/67.13 |
| 2013/0259024 | A1* | 10/2013 | Zhang | H04J 11/0073 370/350 |
| 2015/0358899 | A1* | 12/2015 | Ko | H04W 72/042 370/252 |
| 2016/0066255 | A1* | 3/2016 | Marinier | H04W 48/16 370/350 |

FOREIGN PATENT DOCUMENTS

| | | |
|---|---|---|
| CN | 102457870 A | 5/2012 |
| TW | 201501551 A | 1/2015 |

OTHER PUBLICATIONS

Office action dated Jun. 26, 2018 for CN application No. 201610085647.8, filing date: Feb. 15, 2016, pp. 1-7.
Office action dated Nov. 21, 2018 for CN application No. 201610085647.8, filing date: Feb. 15, 2016, pp. 1-8.

* cited by examiner

*Primary Examiner* — Hardikkumar D Patel
(74) *Attorney, Agent, or Firm* — Winston Hsu (57) ABSTRACT

A method of cell search for a mobile device in a wireless communication system is provided. The method comprises performing a reception timing detection procedure, to obtain at least a possible reception time for a primary synchronization signal (PSS), performing a PSS hypothesis procedure, to generate three frequency-domain PSS sequences according to three root indexes each corresponding to a physical layer identity, and performing a secondary synchronization signal (SSS) coherent detection procedure, to calculate a SSS sequence according to each of the at least a possible reception time with the three frequency-domain PSS sequences, to obtain a physical layer cell identity group corresponding to the SSS sequence.

13 Claims, 8 Drawing Sheets

| $N_{ID}^{(2)}$ | u |
|---|---|
| 0 | 25 |
| 1 | 29 |
| 2 | 34 |

METHOD OF CELL SEARCH

BACKGROUND OF THE INVENTION

1. Field of the Invention

The present disclosure relates to a method used in a communication device in a wireless communication system, and more particularly, to a method of cell search.

2. Description of the Prior Art

In a wireless communication system, an user equipment (UE) first performs cell search to obtain physical layer cell identity when the UE tries to access a network of the wireless communication system, and then performs synchronization with the cell. The UE should obtain the physical layer cell identity in the cell search as soon as possible, to be synchronized with the cell, so as to reduce time and frequency error.

In long term evolution (LTE) system, 504 physical layer cell identities (denoted as $N_{ID}^{cell}$) are allowed, and are divided into unique 168 physical layer cell identity groups (denoted as $N_{ID}^{(1)}$), where each group consist of 3 physical layer identities (denoted as $N_{ID}^{(2)}$). $N_{ID}^{(1)}$ is in the range of 0 to 167, $N_{ID}^{(2)}$ is in the range of 0 to 2, and $N_{ID}^{cell}$ is expressed by $N_{ID}^{cell}=3N_{ID}^{(1)}+N_{ID}^{(2)}$. In addition, the physical layer cell identity is carried by a primary synchronization signal (PSS) and a secondary synchronization signal (SSS). As such, in order to get physical layer cell identity, the UE needs to detect the synchronization signals.

LTE system has frequency division duplexing (FDD) and time division duplexing (TDD) standards. PSS and SSS are transmitted twice per radio frame, namely, a period of 5 ms. In other words, the UE in cell search detects synchronization signals (i.e., PSS detection and SSS detection) with a period of 5 ms, and uses the correlations of PSS and SSS, to get downlink time domain and frequency domain synchronization.

In detail, PSS is constructed from a Zadoff-Chu sequence of length 63 and mapped into the first 31 subcarriers which are spaced on either side of the DC subcarrier. PSS sequence $d_u(n)$ is expressed by:

$$d_u(n) = \begin{cases} e^{-j\frac{\pi u n(n+1)}{63}} & n = 0, 1, \ldots, 30 \\ e^{-j\frac{\pi u(n+1)(n+2)}{63}} & n = 31, 32, \ldots, 61 \end{cases}$$

Figure 1:
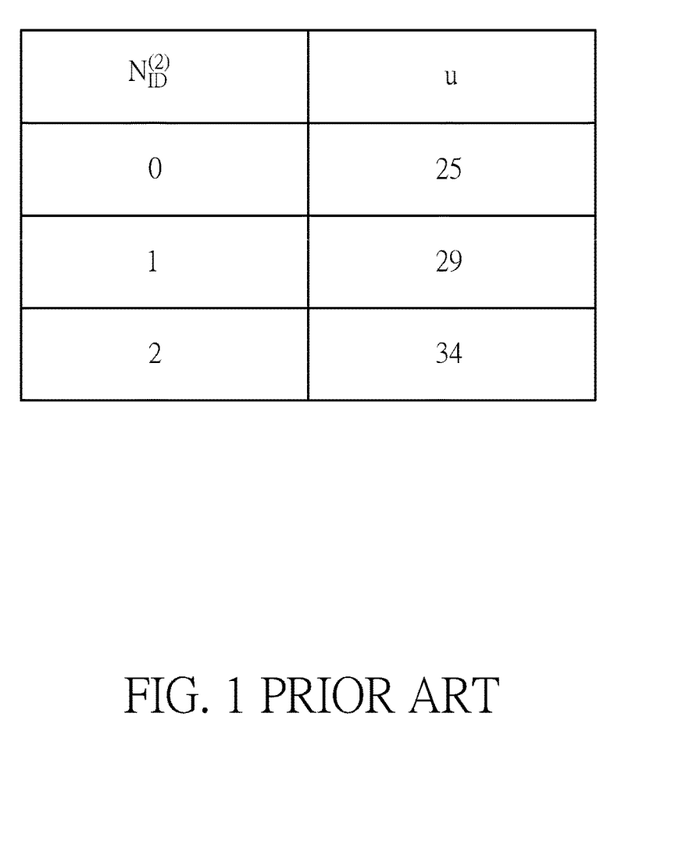
FIG. 1 is a mapping table between physical layer identity and root index.

In a word, PSS sequence $d_u(n)$ is generated according to a root index u. Reference is made to FIG. 1, which illustrates a correspondence between physical layer identity $N_{ID}^{(2)}$ and root index u. As shown in FIG. 1, physical layer identities $N_{ID}^{(2)}=0, 1, 2$ respectively correspond to root indexes u= 25, 29, 34 of Zadoff-Chu sequence. As such, PSS sequence $d_u(n)$ includes three sequences with different root indexes.

On the other hand, SSS sequence is constructed by two binary sequences, each of length 31, and mapped into the first 31 subcarriers which are spaced on either side of the DC subcarrier. These two sequences are scrambled by a scramble sequence, which is related to physical layer identity $N_{ID}^{(2)}$. Therefore, the UE needs to detect PSS first to obtain physical layer identity $N_{ID}^{(2)}$, and then utilizes physical layer identity $N_{ID}^{(2)}$ to generate the scramble sequence for SSS detection. SSS is transmitted in subframe 0 or subframe 5, and is expressed by:

$$d(2n) = \begin{cases} s_0^{(m_0)}(n)c_0(n) & \text{in subframe 0} \\ s_1^{(m_1)}(n)c_0(n) & \text{in subframe 5} \end{cases}$$

$$d(2n+1) = \begin{cases} s_1^{(m_1)}(n)c_1(n)z_1^{(m_0)}(n) & \text{in subframe 0} \\ s_0^{(m_0)}(n)c_1(n)z_1^{(m_1)}(n) & \text{in subframe 5} \end{cases}$$

where $0 \leq n \leq 30$, parameter m represents shift index, in which parameters $m_0$ and $m_1$ are derived from the parameter m, and vectors c, s and z represent m-sequences. Detailed description for these parameters and vectors is as following: shift indexes $m_0$ and $m_1$ obtained by physical layer cell identity group $N_{ID}^{(1)}$ are expressed as:

$$m_0 = m' \bmod 31$$

$$m_1 = (m_0 + \lfloor m'/31 \rfloor + 1) \bmod 31$$

$$m' = N_{ID}^{(1)} + q(q+1)/2, \quad q = \left\lfloor \frac{N_{ID}^{(1)} + q'(q'+1)/2}{30} \right\rfloor,$$

$$q' = \lfloor N_{ID}^{(1)}/30 \rfloor$$

Sequences $s_0^{(m_0)}$ and $s_1^{(m_1)}$ are obtained by m-sequence $\tilde{s}(n)$ with different cyclic shift of $m_0$ and $m_1$, and is expressed as:

$$s_0^{(m_0)}(n) = \tilde{s}((n+m_0) \bmod 31)$$

$$s_1^{(m_1)}(n) = \tilde{s}((n+m_1) \bmod 31)$$

Scramble sequence $c_0(n)$ and $c_1(n)$ are related to $N_{ID}^{(2)}$, and obtained by m-sequence $\tilde{c}(n)$ with the following equation:

$$c_0(n) = \tilde{c}((n+N_{ID}^{(2)}) \bmod 31)$$

$$c_1(n) = \tilde{c}((n+N_{ID}^{(2)}+3) \bmod 31)$$

Sequences $z_1^{(m_0)}$ and $z_1^{(m_1)}$ are obtained by m-sequence $\tilde{z}(n)$ with the following equation:

$$z_1^{(m_0)}(n) = \tilde{z}((n+(m_0 \bmod 8)) \bmod 31)$$

$$z_1^{(m_1)}(n) = \tilde{z}((n+(m_1 \bmod 8)) \bmod 31)$$

Figure 2:
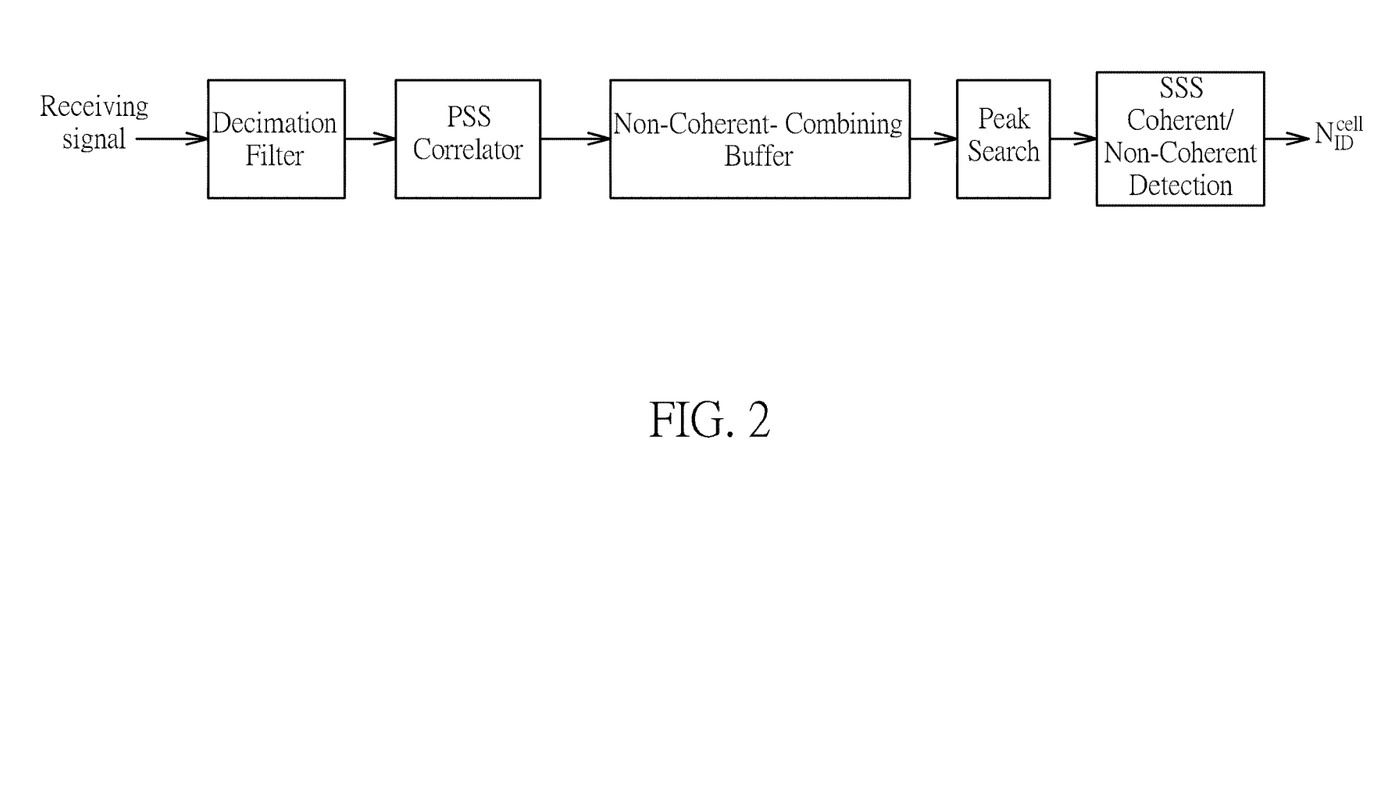
FIG. 2 is a flowchart of cell search.

Reference is made to FIG. 2. In the cell search, the UE detects PSS and then detects SSS based on the detected PSS type (i.e., three root indexes u). PSS and SSS are both deployed within bandwidth of 1.4 MHz, and detected at sample rate of 1.92 MHz. The UE first applies decimation filter to decimate received signals with different sampling frequencies (e.g. 30.72 MHz, 23.04 MHz, . . . , 1.92 MHz) to frequency of 1.92 MHz, and generates three 128-point PSS in the time domain according to three root indexes (i.e., $N_{ID}^{(2)}=0,1,2$). Then, the UE performs correlation on the 128 points PSS in the time domain with the decimated signal. PSS correlation result is outputted to a non-coherent-combining buffer for combining every PSS correlation results in the half frame (5 ms), so as to reduce interference of background noise.

Non-coherent-combining buffer requires size for storing at least 28.8 k samples for one PSS (i.e., 9600 samples detected in half-frame in the time domain, and there are 3 PSS types. Therefore, there are 9600×3=28.8 k samples in the time domain). Moreover, peak search is used for finding the maximum value in the non-coherent-combining buffer at each PSS reception time. Then, the UE compares the maximum value with a threshold for determining whether a PSS is detected, and performs SSS detection with $N_{ID}^{(2)}$ corresponding to the maximum value and with the PSS reception time if the maximum value is larger than the threshold. In other words, if the maximum value is smaller than the threshold, the UE determines that the PSS is not detected, and therefore does not perform SSS detection. SSS detection is applied with coherent or non-coherent method, which is used for transforming the received signal in the time domain to the frequency domain by Fast Fourier transform (FFT) with PSS reception time obtained by the peak search and $N_{ID}^{(2)}$, and performing correlation on each of SSS sequences corresponding to 168 physical layer cell identity group $N_{ID}^{(1)}$ with the transformed signal. In addition, the UE selects the maximum value from the 168 correlation results, and therefore finds the corresponding physical layer cell identity group $N_{ID}^{(1)}$. Finally, the UE can obtain physical layer cell identity $N_{ID}^{cell}$ based on the $N_{ID}^{(2)}$ and physical layer cell identity group $N_{ID}^{(1)}$.

Conventional cell search is not strictly required for frame synchronization, and thus conventional cell search can be used in FDD-LTE mode system. However, for TDD-LTE mode system, frame synchronization is severely important. Thus, conventional cell search is not fit in TDD-LTE mode system with time requirement. For example, small cell is required of frame synchronization less than 3 μs. For OFDM symbol length of 66.67 μs, synchronization signals (i.e., PSS and SSS) transmitted from different cells are overlapping at receiver (i.e., UE), which causes interference between synchronization signals. In other words, strong synchronization signals will affect the detection probability of weak synchronization signals.

SUMMARY OF THE INVENTION

It is therefore an objective to provide a method of cell search to solve the above problem.

The present disclosure provides a method of cell search for a mobile device in a wireless communication system. The method comprises performing a reception timing detection procedure, to obtain at least a possible reception time for a primary synchronization signal (PSS), performing a PSS hypothesis procedure, to generate three frequency-domain PSS sequences according to three root indexes each corresponding to a physical layer identity, and performing a secondary synchronization signal (SSS) coherent detection procedure, to calculate a SSS sequence according to each of the at least a possible reception time with the three frequency-domain PSS sequences, to obtain a physical layer cell identity group corresponding to the SSS sequence.

DETAILED DESCRIPTION

Figure 3:
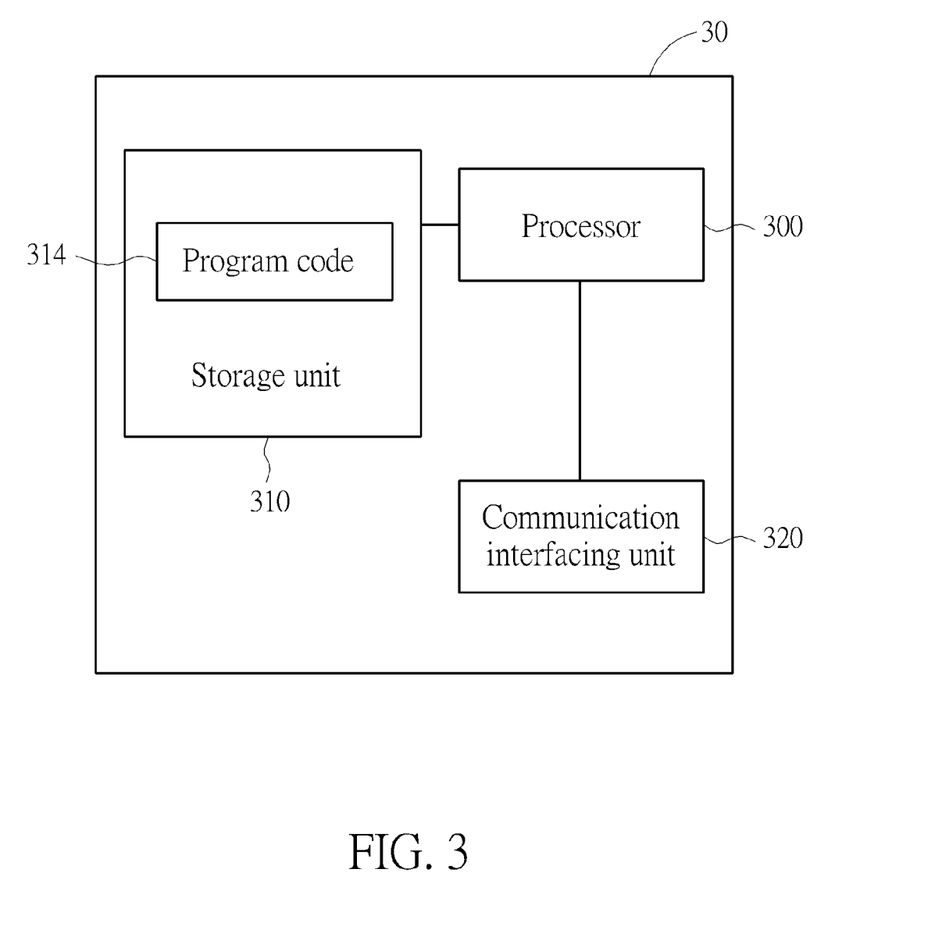
FIG. 3 is a schematic diagram of an exemplary communication device.

FIG. 3 is a schematic diagram of an exemplary communication device 30. The communication device 30 can be the user equipment (UE) and includes a processor 300 such as a microprocessor or Application Specific Integrated Circuit (ASIC), a storage unit 310 and a communication interfacing unit 320. The storage unit 310 may be any data storage device that can store program code 314, for access by the processor 300. Examples of the storage unit 310 include but are not limited to a subscriber identity module (SIM), read-only memory (ROM), flash memory, random-access memory (RAM), CD-ROMs, magnetic tape, hard disk, and optical data storage device. The communication interfacing unit 320 is preferably a radio transceiver and can exchange wireless signals with a network (i.e., an eNB) according to processing results of the processor 300.

Figure 4:
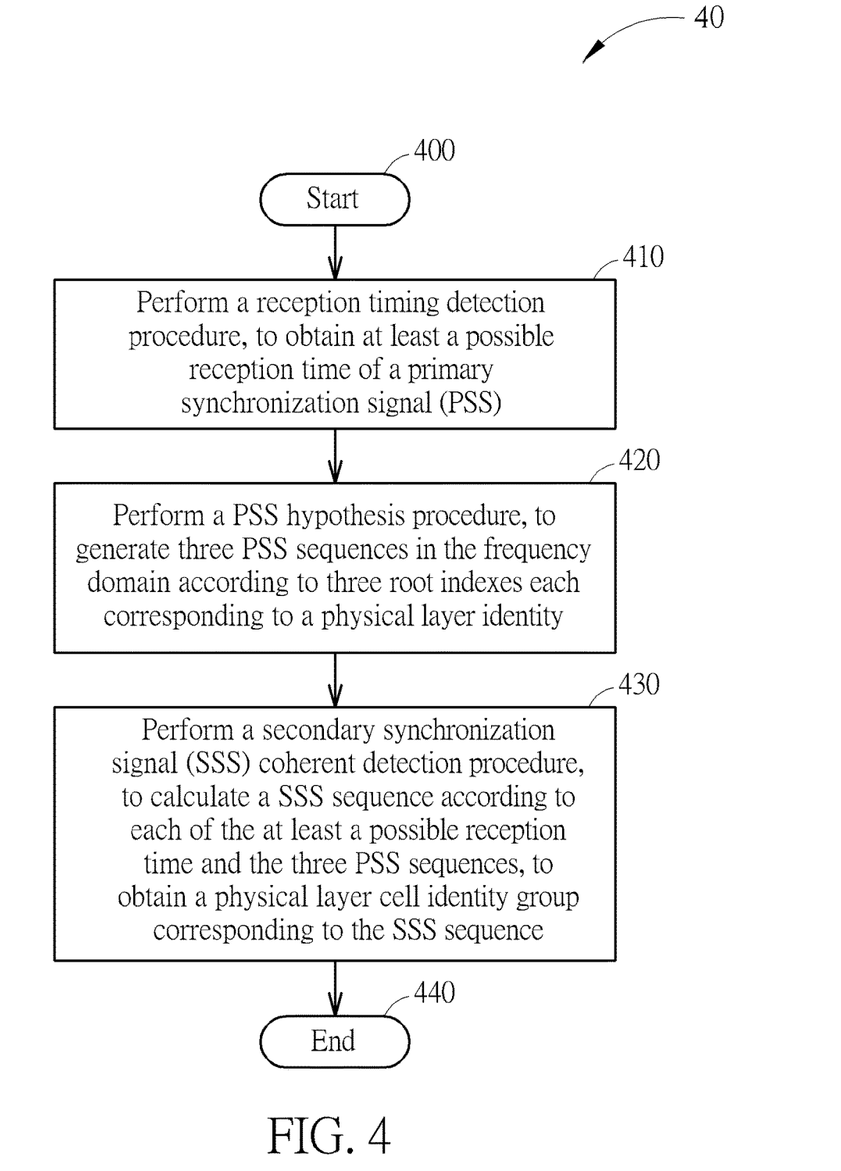
FIG. 4 is a flowchart of an exemplary process according to the present disclosure.

Reference is made to FIG. 4, which is a flowchart of a process 40 according to an embodiment of the present disclosure. The process 40 is utilized in the mobile device 30 of FIG. 1 for reducing cell search time and increasing probability of successful detection in cell search. The process 40 may be compiled into a program code 314 to be stored in the storage unit 310, and may include the following steps:

Step 400: Start.
Step 410: Perform a reception timing detection procedure, to obtain at least a possible reception time of a primary synchronization signal (PSS).
Step 420: Perform a PSS hypothesis procedure, to generate three PSS sequences in the frequency domain according to three root indexes each corresponding to a physical layer identity.
Step 430: Perform a secondary synchronization signal (SSS) coherent detection procedure, to calculate a SSS sequence according to each of the at least a possible reception time and the three PSS sequences, to obtain a physical layer cell identity group corresponding to the SSS sequence.
Step 440: End.

According to the process 40, PSS reception time detection is used for obtaining a possible reception time for the PSS, but not for diagnosis physical layer identity, $N_{ID}^{(2)}$, corresponding to the PSS. After obtaining the PSS reception time, three possible physical layer identities and reception times are inputted to SSS coherent detection for match, to obtain SSS and physical layer cell identity group, $N_{ID}^{(1)}$.

Figure 5:
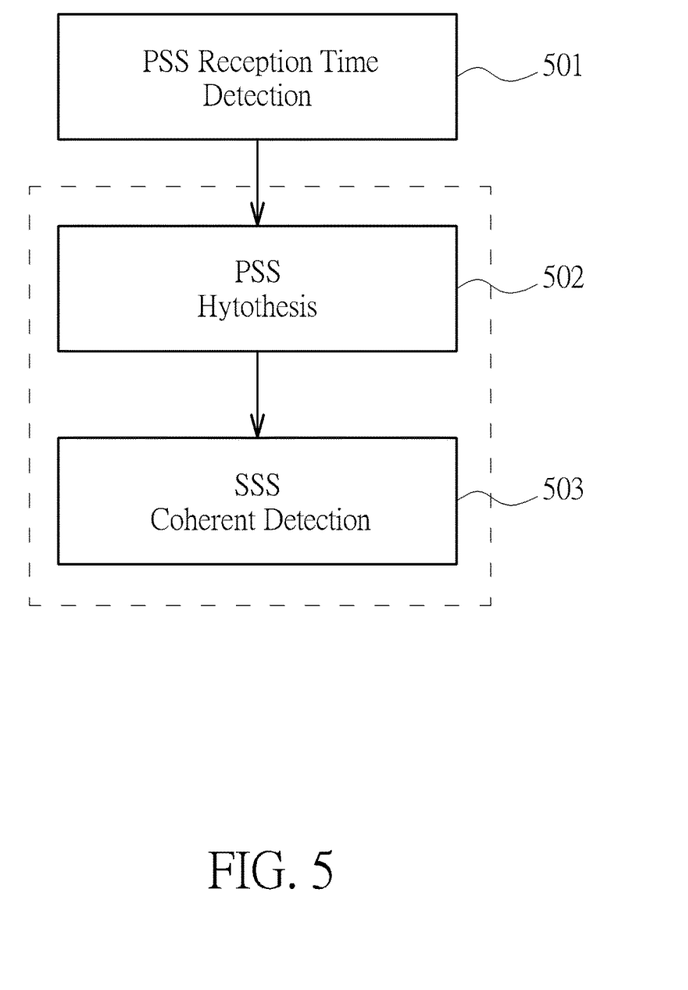
FIG. 5 is a flowchart of cell search according to the present disclosure.
Figure 6:
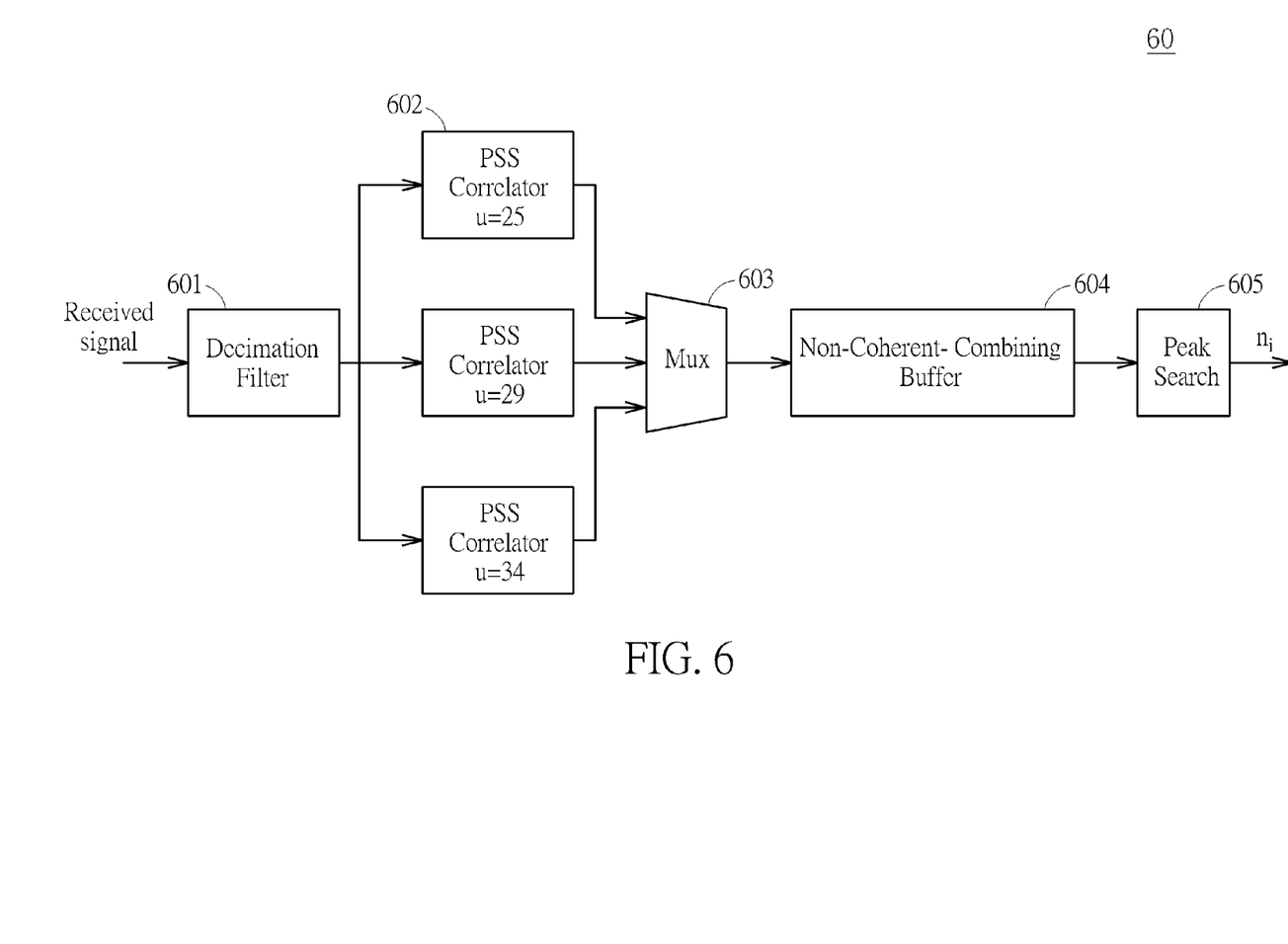
FIG. 6 is a schematic diagram of a PSS reception time detection procedure according to the present disclosure.

Reference is made to FIG. 5. The cell search proposed in the present disclosure includes PSS reception time detection procedure 501, PSS hypothesis procedure 502 and SSS coherent detection procedure 503. The detailed description is as follows:

1. PSS reception time detection procedure:

Reference is made to FIG. 6, which is a schematic diagram of PSS reception time detection procedure 60. The UE decimates the received signal to a frequency of 1.92 MHz (step 601), and performs correlation on the decimated signal with each of three PSS sequences (i.e., PSS sequences based on three root indexes u=25, 29, 34) in the time domain (step 602). In each reception time (i.e., 9600 samples), the UE selects the maximum value of the correlation results (step 603) to output to a non-coherent-combining buffer for combining PSS correlation results in half-frame (step 604). In addition, the UE compares each value in the non-coherent-combining buffer with a threshold for obtaining possible PSS reception time $n_i$ (step 605), and outputs these possible PSS reception times to SSS coherent detection procedure. In detail, if the value of the non-coherent-combining buffer is greater than the threshold, a corresponding possible PSS reception time $n_i$ is obtained for SSS coherent detection procedure. On the other hand, if the value of the non-coherent-combining buffer is smaller than the threshold, no possible PSS reception time $n_i$ is obtained for SSS coherent detection procedure. Note that, PSS reception time detection procedure 60 does not examine the physical layer identity. As such, only one group of non-coherent-combining buffer (namely 9600 samples) is required, so as to save the size of non-coherent-combining buffer (i.e., in the conventional cell search, three groups of non-coherent-combining buffer are required, namely 28.8 k samples).

Figure 7:
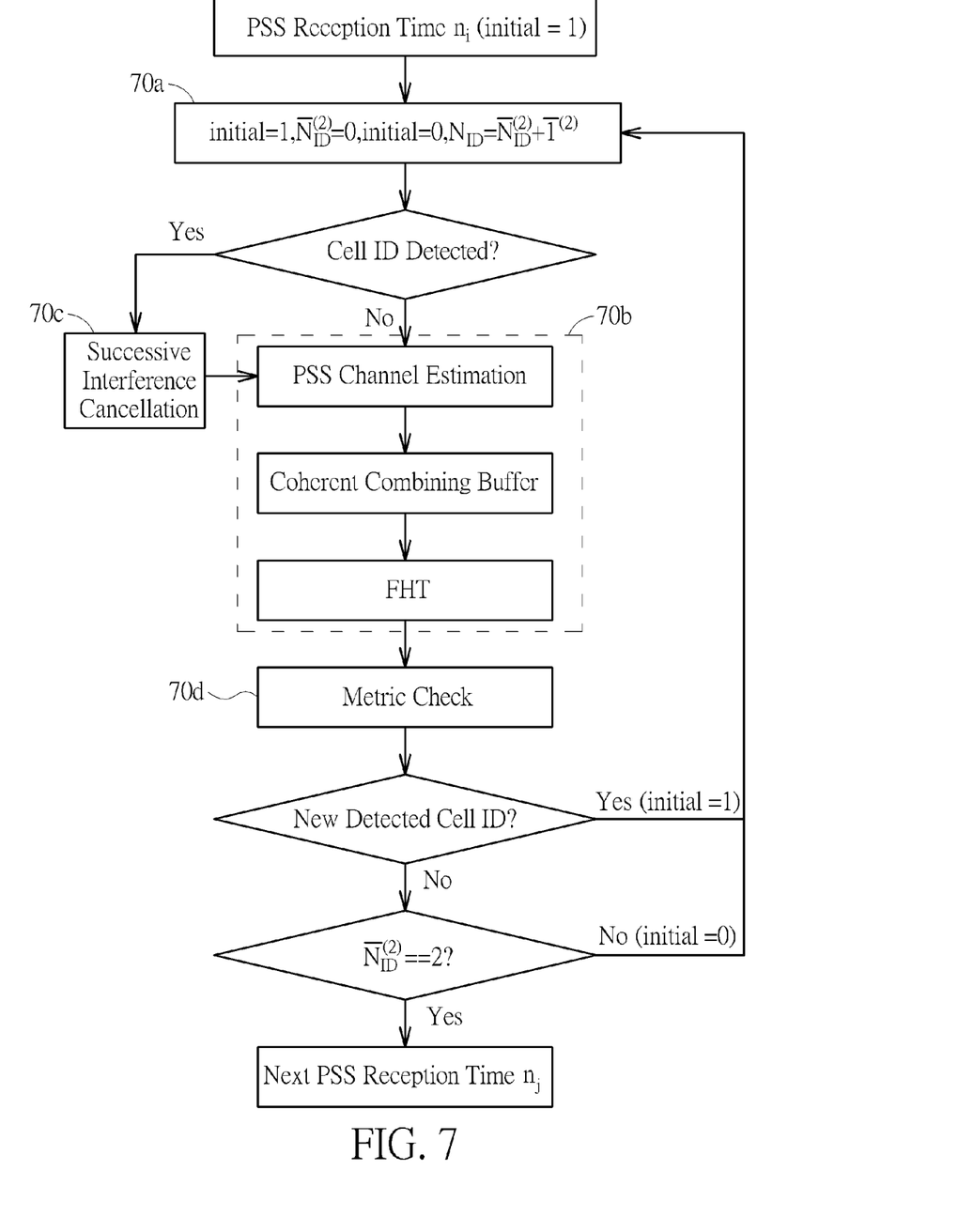
FIG. 7 is a flowchart of cell search according to the present disclosure.

2. PSS hypothesis procedure and SSS coherent detection procedure:

Reference is made to FIG. 7, which is a flowchart of cell search. After obtaining reception time $n_i$ ($0 \le n_i < 9600$) by PSS reception time detection procedure 60, PSS hypothesis procedure 70a is used for inputting each of the three possible physical layer identities ($N_{ID}^{(2)}=0,1,2$) to SSS coherent detection procedure 70b for detection. As shown in FIG. 7, in reception time $n_i$, the parameter "initial" is set on 1, and the initial $N_{ID}^{(2)}=0$ is assumed in the PSS hypothesis procedure 70a.

It should be noted that, for eliminating interferences between synchronization signals, the present disclosure further provides a successive interference cancellation (SIC) procedure. As shown in FIG. 7, the UE first determines whether a cell, namely physical layer cell identity $N_{ID}^{cell}$, is detected in the reception time $n_i$. If a cell is detected, the UE performs SIC procedure 70c, and then performs SSS coherent detection procedure 70b. On the other hand, if a cell is not detected in reception time $n_i$, the UE performs the SSS coherent detection procedure 70b directly.

In SSS coherent detection procedure 70b, the UE performs Fast Fourier transform (FFT) on 128 samples of PSS in the time domain according to PSS reception time $n_i$ obtained by PSS reception time detection procedure 60, to transfer PSS in time domain to frequency domain, given as the following equations:

$$r_{pss}^{n_i}=[r(n_i)r(n_i+1) \ldots r(n_i+127)], Y_{pss}=FFT(r_{pss}^{n_i})$$

On either side of the DC subcarrier, PSS in frequency domain is expressed as:

$$Y_{pss}(k), k=-31,-30,\ldots,-1,1,2,\ldots,31$$

Based on PSS reception time $n_i$ obtained by PSS reception time detection procedure 60 and TDD-LTE mode (i.e., SSS is leading PSS of 2 OFDM symbol time), the UE calculates SSS reception time $n_i'$, and performs FFT on 128 samples of SSS in time domain according to SSS reception time $n_i'$, given as the following equation:

$$r_{sss}^{n_i'}=[r(n_i')r(n_i'+1) \ldots r(n_i'+127)], Y_{sss}=FFT(r_{sss}^{n_i'})$$

On either side of the DC subcarrier, SSS in frequency domain is expressed as:

$$Y_{sss}(k), k=-31,-30,\ldots,-1,1,2,\ldots,31$$

Based on physical layer identity $\overline{N}_{ID}^{(2)}$ of PSS hypothesis procedure 70a, PSS sequence in frequency domain is expressed as:

$$X_{pss}^{\overline{N}_{ID}^{(2)}}(k), k=-31,-30,\ldots,-1,1,2,\ldots,31$$

PSS channel estimation is performed with the formula:

$$\hat{H}_{pss}^{\overline{N}_{ID}^{(2)}}(k) = \{X_{pss}^{\overline{N}_{ID}^{(2)}}(k)\}^{*} Y_{pss}(k)$$

Coherent combining operation is performed on PSS channel estimation result with $Y_{sss}$ to obtain:

$$\hat{X}_{sss}^{\overline{N}_{ID}^{(2)}}(n, k) = \hat{X}_{sss}^{\overline{N}_{ID}^{(2)}}(n-1, k) + \text{Re}\left\{\left(\hat{H}_{pss}^{\overline{N}_{ID}^{(2)}}(k)\right)^{*} Y_{sss}(k)\right\}$$

Re{.} denotes the real part, n is a timeline mark, $\hat{X}_{sss}^{\overline{N}_{ID}^{(2)}}$ is a coherent combining buffer in size of 3×62 samples. A Correlation operation is performed on coherent combining result with SSS sequence, which is given as the following equation:

$$c(\overline{N}_{ID}^{(1)}, \overline{N}_{ID}^{(2)}) = \sum_{k=-31,k \ne 0}^{31} X_{sss}^{\overline{N}_{ID}^{(1,2)}}(k) \cdot \hat{X}_{sss}^{\overline{N}_{ID}^{(2)}}(n, k)$$

$X_{sss}^{\overline{N}_{ID}^{(1,2)}}$ is SSS sequence after obtaining physical layer cell identity group $\overline{N}_{ID}^{(1)}$ and physical layer identity $\overline{N}_{ID}^{(2)}$, and is expressed as:

$$X_{sss}^{\overline{N}_{ID}^{(1,2)}}(k), k=-31,-30,\ldots,-1,1,2,\ldots,31$$

Since SSS sequence is constructed with m-sequence, correlation operation on SSS sequence can be calculated by fast-hardmard transform (FHT), to reduce complexity of hardware implementation.

The present disclosure discloses that the UE finds possible PSS reception time in the time domain, but does not examine the type of PSS sequence. Therefore, the present disclosure further provides a metric check procedure 70d, to determine whether a cell is detected based on the correlation operation on SSS sequence. The metric check procedure 70d includes the following steps:

Selecting the maximum value from the correlation result, given as the following equation:

$$c_{max}^{\overline{N}_{ID}^{(1,2)}} = \underset{\overline{N}_{ID}^{(1)}=0,1,\ldots,167}{\arg\max} \; c(\overline{N}_{ID}^{(1)}, \overline{N}_{ID}^{(2)})$$

Defining a threshold Q by equation:

$$Q = \frac{c_{max}^{\overline{N}_{ID}^{(1,2)}}}{q}$$

q is the total energy and expressed as:

$$q = \sum_{k=-31,k \ne 0}^{31} \left| \hat{X}_{sss}^{\overline{N}_{ID}^{(2)}}(n, k) \right|$$

The threshold Q should satisfy the condition of $Q \le 1$. If the threshold Q is larger than the predefined value, such as 0.8, the UE determines that a new cell is detected, and then calculates a new detected cell identity by the equation: $N_{ID}^{cell}=3\overline{N}_{ID}^{(1)}+\overline{N}_{ID}^{(2)}$. In addition, the UE sets "initial" to 1, which means that physical layer identity $\overline{N}_{ID}^{(2)}$ of PSS hypothesis procedure 70a is set to 0, performs SIC procedure 70c according to the detected $N_{ID}^{cell}$, and then performs SSS coherent detection procedure 70b. Otherwise, the UE gives up the physical layer identity $\overline{N}_{ID}^{(2)}$ of PSS hypothesis procedure 70a, and sets "initial" to 0. That is, another physical layer identity $\overline{N}_{ID}^{(2)}$ (i.e., $\overline{N}_{ID}^{(2)}=\overline{N}_{ID}^{(2)}+1$, namely $\overline{N}_{ID}^{(2)}=1$) is assumed in PSS hypothesis procedure 70a, for performing the SSS coherent detection procedure 70b. It should be noted that, if three possible physical layer identities $\overline{N}_{ID}^{(2)}$ are all performed within the SSS coherent detection procedure 70b and no new cell is detected, cell search in reception time $n_i$ is completed. The UE then applies the next reception time $n_j$ for PSS hypothesis procedure 70a and SSS coherent detection procedure 70b. In other words, if not all of the three possible physical layer identities $\overline{N}_{ID}^{(2)}$, namely $\overline{N}_{ID}^{(2)}$=0, 1, 2, are performed within the SSS coherent detection procedure 70b, the UE continuous the SSS coherent detection procedure 70b in the same reception time $n_j$ until all of the three possible physical layer identities $\overline{N}_{ID}^{(2)}$ are performed within the SSS coherent detection procedure 70b, as shown in step "$\overline{N}_{ID}^{(2)}$32 =2?" of FIG. 7. On the other hand, if the threshold Q is smaller than the predefined value, the UE determines that a new cell is not detected, and thus no new detected cell identity is obtained, as shown in step "No" from step "New Detected Cell ID?" of FIG. 7.

Figure 8:
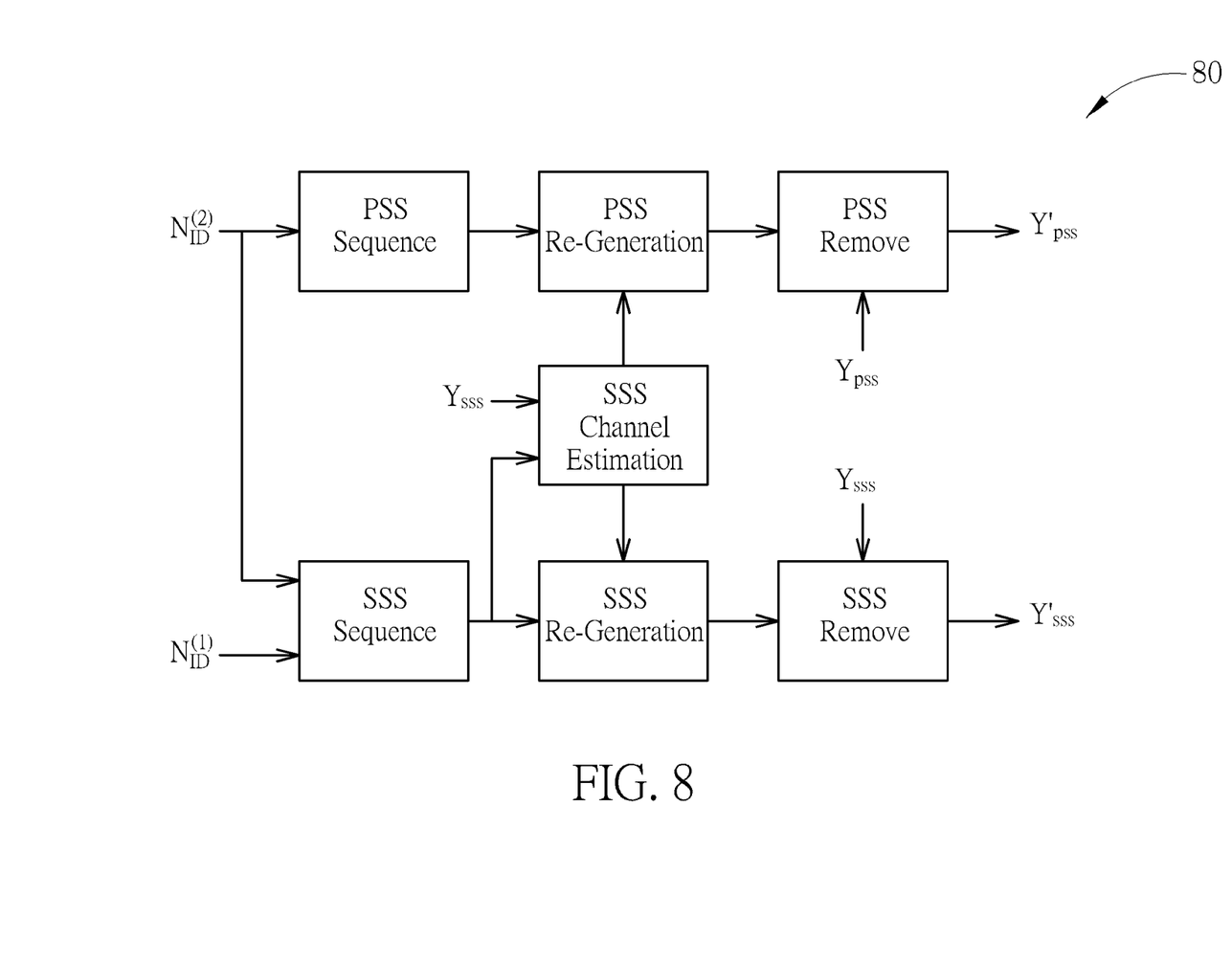
FIG. 8 is a schematic diagram of successive interference cancellation procedure according to the present disclosure.

In addition, if a new cell is detected, the UE performs SIC procedure 70c. Reference is made to FIG. 8, which is a flowchart of SIC procedure 80. The UE calculates PSS sequence $X_{pss}$ and SSS sequence $X_{SSS}$ in the frequency domain according to the detected physical layer cell identity group $\overline{N}_{ID}^{(1)}$ and physical layer identity $\overline{N}_{ID}^{(2)}$, and then performs channel estimation of SSS, which is given as the following equation:

$$\hat{H}_{sss}(k)=X_{sss}(k)Y_{sss}(k)$$

SSS channel estimation for re-generating PSS and SSS is given as the following equation:

$$\tilde{Y}_{pss}(k)=X_{pss}(k)\hat{H}_{sss}(k),\ \tilde{Y}_{sss}(k)=X_{sss}(k)\hat{H}_{sss}(k)$$

The re-generated PSS and SSS is removed from the received PSS and SSS respectively, which is given as the following equation:

$$Y'_{pss}(k)=Y_{pss}(k)-\tilde{Y}_{pss}(k),\ Y'_{sss}(k)-\tilde{Y}_{sss}(k)$$

Finally, the received PSS $Y_{pss}$ and SSS $Y_{sss}$ are replaced with the removed PSS $Y'_{pss}$ and SSS $Y'_{sss}$ for SSS coherent detection procedure 70b. The abovementioned SIC procedure 80 is completed in the frequency domain, and is not required to transform to time domain for detecting weak PSS, so as to save the cell search time. In the conventional cell search, the UE operates from the frequency domain to the time domain for SIC procedure after detecting a cell and obtaining physical layer cell identity, to eliminate interference between synchronization signals. However, with such manner, the UE cannot perform SIC procedure in the current frame, in which the UE detects a cell, but in the next frame, causing delay of synchronization between the UE and the cell.

The abovementioned steps of the processes including suggested steps can be realized by means that could be a hardware, a firmware known as a combination of a hardware device and computer instructions and data that reside as read-only software on the hardware device or an electronic system. Examples of hardware can include analog, digital and mixed circuits known as microcircuit, microchip, or silicon chip. Examples of the electronic system can include a system on chip (SOC), system in package (SiP), a computer on module (COM) and the communication device 30.

In conclusion, the present disclosure provides a new cell search to solve the problem of that weak PSS cannot be detected due to multiple PSS co-existed in the time domain, which causes interference to each other and cannot eliminated by non-coherent combining operation. Moreover, the present disclosure utilizes metric check mechanism along with PSS hypothesis procedure and SSS correlation operation in the frequency domain, to determine whether a cell is detected. Further, SIC procedure performed in frequency domain is proposed in the present disclosure to eliminate interference from the strong cell, so as to increase the probability of detecting the weak cell.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of cell search for a mobile device in a wireless communication system, the method comprising:
   performing a reception timing detection procedure, to obtain at least a possible reception time for a primary synchronization signal (PSS);
   performing a PSS hypothesis procedure, to generate three frequency-domain PSS sequences according to three root indexes each corresponding to a physical layer identity;
   performing a secondary synchronization signal (SSS) coherent detection procedure, to calculate a SSS sequence according to each of the at least a possible reception time with the three frequency-domain PSS sequences, to obtain a physical layer cell identity group corresponding to the SSS sequence, wherein the SSS coherent detection procedure includes a fast-hardmard transform operation; and
   performing a check procedure to determine whether the SSS sequence is detected, wherein the check procedure comprises:
      determining that the SSS sequence is detected, and obtaining a corresponding physical layer cell identity group when the fast-hardmard transform operation result is greater than a predetermined value; and
      determining that the SSS sequence is not detected when the fast-hardmard transform operation result is smaller than the predetermined value.

2. The method of claim 1, wherein the reception timing detection procedure comprises:
   receiving a wireless signal from the wireless communication system;
   performing a decimation procedure on the received wireless signal to reduce a data rate of the received wireless signal to a sample rate of the PSS;
   performing correlation on the decimated wireless signal and three time-domain PSS sequences, wherein the time-domain PSS sequences include a first, a second and a third time-domain PSS sequences generated by the mobile device according to a first, second and third root indexes respectively;
   generating a calculation result based on a non-coherent combining operation with the maximum value outputted from a first, a second, and a third correlation results in each sample time of a PSS transmission period; and
   comparing the calculation result with a predetermined value, for determining whether the PSS is detected.

3. The method of claim 2, wherein the step of comparing the calculation result with the predetermined value, for determining whether the PSS is detected, comprises:
   determining that the PSS is detected when the calculation result is larger than the predetermined value, and determining the sample time corresponding to the calculation result as a reception time of the PSS; and
   determining that the PSS is not detected when the calculation result is smaller than the predetermined value.

4. The method of claim 1, wherein the SSS coherent detection procedure includes a PSS channel estimation operation, and a coherent combining operation.

5. The method of claim 1, further comprising:
calculating a physical layer cell identity corresponding to a cell based on the obtained physical layer cell identity group and a first, a second or a third physical layer identity, in which the first, second and third physical layer identities respectively correspond to the three frequency-domain PSS sequences for the SSS coherent detection procedure; and
performing a successive interference cancellation procedure, wherein the successive interference cancellation procedure includes steps:
generating a first PSS sequence and a first SSS sequence in the frequency domain based on the physical layer cell identity group and the first, second or third physical layer identity;
performing a channel estimation corresponding to the first SSS sequence;
re-generating a second PSS and a second SSS based on the channel estimation result, the first PSS sequence and the first SSS sequence, in which each of the second PSS and the second SSS is a part of the synchronization signal; and
obtaining a third PSS by removing the re-generated second PSS from the PSS, and obtaining a third SSS by removing the re-generated second SSS from the SSS.

6. The method of claim 1, further comprising:
determining whether the SSS coherent detection procedure are performed on the three frequency-domain PSS sequences with a first reception time of the at least a reception time when the SSS is determined to be not detected;
performing the SSS coherent detection procedure on the three frequency-domain PSS sequences with a second reception time when the SSS coherent detection procedure are performed to all of the three frequency-domain PSS sequences with the first reception time; and
performing the SSS coherent detection procedure on the three frequency-domain PSS sequences with the first reception time when the SSS coherent detection procedure is not performed to all of the three frequency-domain PSS sequences with the first reception time.

7. A method of detecting primary synchronization signal (PSS) reception time for a mobile device in a wireless communication system, the method comprising:
receiving a wireless signal from the wireless communication system;
performing a decimation procedure on the received wireless signal to reduce a data rate of the received wireless signal to a sample rate for the PSS;
performing correlation on the decimated wireless signal and each of three time-domain PSS sequences, wherein the three time-domain PSS sequence includes a first, a second and a third PSS sequences generated by the mobile device according to a first, second and third root indexes respectively;
generating a calculation result based on a non-coherent combining operation with the maximum value outputted from a first, a second, and a third correlation results in each sample time of a PSS transmission period;
comparing the calculation result with a predetermined value, for determining whether the PSS is detected;
performing a secondary synchronization signal (SSS) coherent detection procedure, to calculate a SSS sequence according to each of the at least a possible reception time with the three frequency-domain PSS sequences, to obtain a physical layer cell identity group corresponding to the SSS sequence, wherein the SSS coherent detection procedure includes a fast-hardmard transform operation; and
performing a check procedure to determine whether the SSS sequence is detected, wherein the check procedure comprises:
determining that the SSS sequence is detected, and obtaining a corresponding physical layer cell identity group when the fast-hardmard transform operation result is greater than a predetermined value; and
determining that the SSS sequence is not detected when the fast-hardmard transform operation result is smaller than the predetermined value.

8. The method of claim 7, wherein the step of comparing the calculation result with the predetermined value, for determining whether the PSS is detected, comprises:
determining that the PSS is detected when the calculation result is larger than the predetermined value, and determining the sample time corresponding to the calculation result as a reception time of the PSS; and
determining that the PSS is not detected when the calculation result is smaller than the predetermined value.

9. The method of claim 7, further comprising:
performing a PSS hypothesis procedure, to generate three frequency-domain PSS sequences according to three root indexes each corresponding to a physical layer identity.

10. The method of claim 9, wherein the SSS coherent detection procedure includes a PSS channel estimation operation, and a coherent combining operation.

11. The method of claim 7, further comprising:
calculating a physical-layer cell identity corresponding to a cell based on the obtained physical layer cell identity group and a first, second or a third physical layer identity, in which the first, second and third physical-layer identities respectively correspond to the three frequency-domain PSS sequences for the SSS coherent detection procedure; and
performing a successive interference cancellation (SIC) procedure, for removing interference from a synchronization signal received from the cell, wherein the SIC procedure comprises:
generating a first PSS sequence and a first SSS sequence in the frequency domain based on the physical layer cell identity group and the first, second or third physical layer identity;
performing a channel estimation corresponding to the first SSS sequence; re-generating a second PSS and a second SSS based on the channel estimation result, the first PSS sequence and the first SSS sequence, in which each of the second PSS and the second SSS is a part of the synchronization signal; and
obtaining a third PSS by removing the re-generated second PSS from the PSS, and obtaining a third SSS by removing the re-generated second SSS from the SSS.

12. The method of claim 7, further comprising:
determining whether the SSS coherent detection procedure are performed on the three frequency-domain PSS sequences with a first reception time of the at least a reception time when the SSS is determined to be not detected;

performing the SSS coherent detection procedure on the three frequency-domain PSS sequences with a second reception time when the SSS coherent detection procedure are performed to all of the three frequency-domain PSS sequences with the first reception time; and performing the SSS coherent detection procedure on the three frequency-domain PSS sequences with the first reception time when the SSS coherent detection procedure is not performed to all of the three frequency-domain PSS sequences with the first reception time.

13. A method of cell search for a mobile device in a wireless communication system, the method comprising:

performing a reception timing detection procedure, to obtain at least a possible reception time for a primary synchronization signal (PSS);

performing a PSS hypothesis procedure, to generate three frequency-domain PSS sequences according to three root indexes each corresponding to a physical layer identity; and performing a secondary synchronization signal (SSS) coherent detection procedure, to calculate a SSS sequence according to each of the at least a possible reception time with the three frequency-domain PSS sequences, to obtain a physical layer cell identity group corresponding to the SSS sequence;

wherein the reception timing detection procedure comprises:

receiving a wireless signal from the wireless communication system;

performing a decimation procedure on the received wireless signal to reduce a data rate of the received wireless signal to a sample rate of the PSS;

performing correlation on the decimated wireless signal and three time-domain PSS sequences, wherein the time-domain PSS sequences include a first, a second and a third time-domain PSS sequences generated by the mobile device according to a first, second and third root indexes respectively;

generating a calculation result based on a non-coherent combining operation with the maximum value outputted from a first, a second, and a third correlation results in each sample time of a PSS transmission period; and comparing the calculation result with a predetermined value, for determining whether the PSS is detected, wherein the step of comparing the calculation result with the predetermined value, for determining whether the PSS is detected, comprises:

determining that the PSS is detected when the calculation result is larger than the predetermined value, and determining the sample time corresponding to the calculation result as a reception time of the PSS; and determining that the PSS is not detected when the calculation result is smaller than the predetermined value.

* * * * *